United States Patent Office 2,948,659
Patented Aug. 9, 1960

2,948,659

SYNTHESIS OF 2-KETO-L-GULONIC ACID

Richard N. Shoemaker, Huntington Station, N.Y., assignor to Chas. Pfizer & Co., Inc., New York, N.Y., a corporation of Delaware No Drawing. Filed Aug. 10, 1954, Ser. No. 449,000

2 Claims. (Cl. 195—47)

This invention concerns a novel process for the preparation of 2-keto-1-gulonic acid. More specifically it is concerned with the preparation of this compound by subjecting 1-idonic acid or a non-toxic 1-idonate to biological oxidation.

The product of this invention, 2-keto-1-gulonic acid, is a compound of great value. Illustrative of this value is the fact that the compound is an intermediate in the presently used commercial synthesis of ascorbic acid.

Various organisms have been used in the past to oxidize 1-idonic acid to 2-keto-1-gulonic acid. *Pseudomonas mildenbergii, Cyanococcus chromospirans, Pseudomonas aeruginosa, Pseudomonas fluorescens,* and *Acetobacter suboxydans* var. *melanogenum* have been reported as carrying out this reaction.

It has now been discovered that the conversion of 1-idonic acid to 2-keto-1-gulonic acid may be carried out by a mixture of two organisms. A living culture of each of these organisms has been deposited with the American Type Culture Collection in Washington, D.C., where they have been given the numbers ATCC 11867 and ATCC 11868 respectively.

It is not certain whether these two organisms are different species or simply variants of the same species. Each is a Gram-negative, straight-celled bacillus. Each converts nitrate to nitrite. Neither produces endospores. Neither liquefies gelatin, nor does either form indole. When the mixture is streaked out on agar plates and grown at 28° C., two types of colonies are noticed. One is a light yellow (ATCC 11867), and the other is colorless and translucent (ATCC 11868). When the mixture is grown at 37° C., however, only the colorless, translucent type of colony is obtained. Surprisingly, neither organism alone will convert 1-idonic acid to 2-keto-1-gulonic acid in appreciable yield, but the mixture carries out the reaction in practically quantitative yield.

It has not been possible to assign either organism to any classification listed in Bergey's Determinative Bacteriology, 6th edition. Apparently the organism belong to a new species, or perhaps to two new species. It is, however, certain that each is different from any organism previously reported as carrying out this reaction. It is also certain that the use of a mixture or organisms is unprecedented for carrying out this type of fermentation reaction.

A mixed culture of ATCC 11867 and ATCC 11868 has several remarkable properties which make it exceptionally suited for the preparation of 2-keto-1-gulonic acid, in industrial quantities. The conversion of 1-idonic acid to the desired product is practically quantitative. The product is purified readily. The mixture is readily grown. Also very significant is the fact that no special adaptation process is needed in order that the mixture carry out this reaction in excellent yield.

An object of this invention is the preparation of 2-keto-1-gulonic acid by subjecting 1-idonc acid or a non-toxic 1-idonate to the oxidizing system produced by cultivating a mixture of ATCC 11867 and ATCC 11868. This object may be realized in any of several ways. For example, the mixture may be grown under aerobic conditions on an otherwise sterile nutrient medium containing 1-idonic acid or an 1-idonate. Alternatively, to such a medium in which growth has been established 1-idonic acid or an 1-idonate may be added. The reaction may also be carried out by subjecting 1-idonic acid or an 1-idonate to a suspension of cells so grown or to a cell-free broth in which the mixture has been grown. The mixture may also be grown on an otherwise sterile solid or semi-solid nutrient medium, an extract of which will carry out the conversion. Other modifications will also readily occur to one skilled in the art. All of these procedures are included in the expression "subjecting to the oxidizing system produced by cultivating a mixture of ATCC 11867 and ATCC 11868."

Each organism, or the mixture of organisms, may readily be grown on standard nutrient media commonly used for the study of bacteria. To illustrate, a liquid nutrient medium containing a source of carbohydrate such as dextrose, inorganic salts such as potassium phosphate and magnesium sulfate, a protein source such as peptone, and growth promoting substances such as yeast extract may be used. The cultivation may also readily be carried out on ordinary nutrient agar slants.

A method of carrying out the preparation of 2-keto-1-gulonic acid is illustrated by the following outline of such a procedure. A solution containing nutrients such as dextrose and yeast extract is charged with 1-idonic acid or a non-toxic 1-idonate and inoculated with a mixed culture of ATCC 11867 and ATCC 11868 which has previously been grown on either agar slants or a liquid nutrient medium. The fermentation broth is shaken under aerobic conditions at a temperature of between about 25 and 30° C. The size of the inoculum will determine the time necessary to carry out the reaction. Generally good conversion will be produced in about 34 hours by 1 cc. of a 48-hour inoculum in 100 cc. of fermentation mixture.

It has been found that progress of the reaction may be followed by means of a color test using orthphenylenediamine dihydrochloride. This reagent is thought to be specific for 2-keo-hexonic acids under the following conditions. It is used in a 2½ aqueous solution. A sample of the reaction mixture is diluted so that it contains from 25 to 100 gamma of product per milliliter. A sample of this solution is then treated with the orthophenylenediamine dihydrochloride reagent, the reagent volume being about one-half that of the sample. The mixture is heated on a water bath for one-half hour. After cooling, the mixture is placed in a Beckman spectrometer, and readings are made at 330 m$\mu$. A straight line relationship exists between the concentration of 2-keto-1-gulonic acid and the optical density of the sample line at this wave length.

*Example I*

A culture of a mixture of ATCC 11867 and ATCC 11868 was grown for 48 hours on a nutrient broth containing 0.25% yeast extract. This yeast extract, while conveniently used, is not necessary. 1 cc. of this broth was inoculated into 100 cc. of an aqueous fermentation mixture having the following composition by weight:

2% sodium-1-idonate
0.1% dextrose
0.5% yeast extract

The unadjusted pH of this mixture was 7.0. The mixture was maintained at 28° C. under aerobic conditions. At the end of 34 hours, 2-keto-1-gulonic acid was isolated by the following procedure. The broth was concentrated to about one quarter of its original volume by evaporation. The pH, which had risen to about 7.7 was brought down to about 4 by the addition of acetic acid. Sodium hydroxide was then added to bring the pH up to about 7.5. This procedure is used to preclude the formation of ammonium salts which might form from ammonia resulting from the metabolism of the nitrogen salts. Methyl alcohol in a quantity so that 70% of the total final volume is that of alcohol, was then added. A precipitate of sodium 2-keto-1-gulonate resulted. This precipitate was then filtered off. The yield was practically quantitative. Treatment of the salt with a non-oxidizing strong acid such as hydrochloric acid yielded the free acid.

There are many obvious embodiments of this invention. The foregoing example is given solely for the purpose of illustrating one possible embodiment and is not to be construed as a limitation of the invention, which is to be limited by the appended claims only. Wide variations are possible in such things as the composition of the nutrient medium, and none of the components listed above for such media is a critical factor. In a manner similar to that described above for the sodium salt, 1-idonic acid or a non-toxic 1-idonate may be used. The term "no-toxic 1-idonate" includes salts of metals, for example the alkali metals, ammonia and amines which will not interfere with the metabolism of the organism, and esters of simple alcohols, e.g. methanol and ethanol. A minimum of simple testing will readily show whether or not a particular 1-idonate is toxic.

What is claimed is:

1. A process for preparing 2-keto-1-gulonic acid which process comprises subjecting to the oxidizing system produced by cultivating a mixture of ATCC 11867 and ATCC 11868 under aerobic conditions on an otherwise sterile nutrient medium, a compound selected from the group consisting of 1-idonic acid and a non-toxic 1-idonate.

2. A process for the preparation of 2-keto-1-gulonic acid which process comprises subjecting a compound selected from the group consisting of 1-idonic acid and a non-toxic 1-idonate to submerged, aerobic fermentation with a mixed culture of ATCC 11867 and ATCC 11868.

References Cited in the file of this patent

UNITED STATES PATENTS

| | | |
|---|---|---|
| 2,421,611 | Gray | June 3, 1947 |
| 2,421,612 | Gray | June 3, 1947 |

OTHER REFERENCES

Annals of the New York Academy of Sciences, vol. 60, art. 1, pp. 5, 24, 27.

Konikow: "Bacteria for Sale," Science Digest, vol. 37, No. 6, June 1953, pp. 13–17.

UNITED STATES PATENT OFFICE
CERTIFICATE OF CORRECTION

Patent No. 2,948,659                                August 9, 1960

Richard N. Shoemaker

It is hereby certified that error appears in the printed specification of the above numbered patent requiring correction and that the said Letters Patent should read as corrected below.

Column 1, line 70, for "l-idonc acid" read -- l-idonic acid --; column 2, line 41, for "orthphenylene-" read -- orthophenylene- --; line 43, for "2-keo-hexonic" read -- 2-keto-hexonic --; line 44, for "2½" read -- 2½% --.

Signed and sealed this 4th day of April 1961.

(SEAL)
Attest:     ERNEST W. SWIDER

Attesting Officer                                    ARTHUR W. CROCKER
                                                           Acting Commissioner of Patents